United States Patent
Zhang et al.

(10) Patent No.: US 9,268,537 B1
(45) Date of Patent: *Feb. 23, 2016

(54) AUTOMATIC GENERATION OF DOMAIN-AWARE PHASE ORDERING FOR EFFECTIVE OPTIMIZATION OF CODE FOR A MODEL

(71) Applicant: The MathWorks, Inc., Natick, MA (US)

(72) Inventors: Yuchen Zhang, Dover, MA (US); Partha Biswas, Wayland, MA (US); Xiaocang Lin, Sherborn, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/629,663

(22) Filed: Feb. 24, 2015

Related U.S. Application Data

(63) Continuation-in-part of application No. 14/264,474, filed on Apr. 29, 2014.

(51) Int. Cl.
G06F 9/44 (2006.01)

(52) U.S. Cl.
CPC .......................... *G06F 8/35* (2013.01)

(58) Field of Classification Search
USPC .................. 717/101–109, 120–122
IPC ........................ G06F 8/20,8/35, 8/355
See application file for complete search history.

(56) References Cited

U.S. PATENT DOCUMENTS

| | | | | |
|---|---|---|---|---|
| 6,662,357 | B1 * | 12/2003 | Bowman-Amuah | 717/120 |
| 7,076,766 | B2 * | 7/2006 | Wirts | G06F 8/38 717/121 |
| 7,137,100 | B2 * | 11/2006 | Iborra | G06F 8/30 717/104 |
| 7,404,175 | B2 * | 7/2008 | Lee et al. | 717/104 |
| 7,533,365 | B1 * | 5/2009 | Hogstrom et al. | 717/105 |
| 7,681,176 | B2 * | 3/2010 | Wills | G06F 8/34 717/104 |
| 7,823,122 | B1 * | 10/2010 | Englehart | 717/106 |
| 7,865,874 | B2 * | 1/2011 | Wookey | G06F 8/61 717/120 |
| 7,890,923 | B2 * | 2/2011 | Elaasar | G06F 8/75 717/104 |
| 7,895,566 | B2 * | 2/2011 | Shenfield et al. | 717/107 |
| 8,006,224 | B2 * | 8/2011 | Bateman et al. | 717/104 |
| 8,037,449 | B2 * | 10/2011 | Iborra | G06F 8/30 717/105 |
| 8,069,434 | B2 * | 11/2011 | Ploesser | G06F 8/20 717/104 |

(Continued)

OTHER PUBLICATIONS

Bacher "Automatic Generation of Optimization Code Based on Symbolic Non-Linear Domain Formulation", ACM, pp. 283-291, 1996.*

(Continued)

*Primary Examiner* — Anil Khatri
(74) *Attorney, Agent, or Firm* — Harrity & Harrity, LLP

(57) ABSTRACT

A device receives a model, in a technical computing environment, that includes blocks and lines, and determines an application domain associated with the model. The device determines code generation optimizations for the model, determines dependencies of the code generation optimizations, and determines performance characteristics for the device. The device determines capabilities of a target compiler for the code generated based on the model, and determines a profile for target hardware to be used to execute the code. The device identifies an order for the code generation optimizations based on the determined information, generates optimal code for the model based on the identified order for the code generation optimizations, and outputs and/or store the optimal code.

23 Claims, 11 Drawing Sheets

(56) References Cited

U.S. PATENT DOCUMENTS

| | | | | |
|---|---|---|---|---|
| 8,271,941 | B2 * | 9/2012 | Zhang | G06Q 10/00 717/107 |
| 8,291,378 | B2 * | 10/2012 | Arnold | G06F 8/61 717/104 |
| 8,510,706 | B1 * | 8/2013 | Bartlett | 717/105 |
| 8,522,196 | B1 * | 8/2013 | Kim et al. | 717/105 |
| 8,533,660 | B2 * | 9/2013 | Mehr | G06F 8/10 717/104 |
| 8,572,560 | B2 * | 10/2013 | Drissi et al. | 717/120 |
| 8,607,190 | B2 * | 12/2013 | Coldicott | G06F 8/10 707/793 |
| 8,832,641 | B2 * | 9/2014 | Schneider | G06F 17/30867 717/104 |
| 8,887,130 | B2 * | 11/2014 | Seetharaman | G06F 8/10 717/108 |

OTHER PUBLICATIONS

Hazelwood et al, "Exploring Code Cache Eviction Granularities in Dynamic Optimization Systems", IEEE, pp. 1-11, 2004.*

Drinic et al, "Code Optimization for Code Compression", IEEE, pp. 315-324, 2003.*

Lin et al, "Recovery Code Generation for General Speculative Optimizations ", ACM Transactions on Architecture and Code Optimization, vol. 3, No. 1, pp. 67-89, 2006.*

Taentzer et al, "Towards Refactoring of Rule-Based, In-Place Model Transformation Systems", ACM, pp. 41-46, 2012.*

Nusayr et al, "AOP for the Domain of Runtime Monitoring: Breaking Out of the Code-Based Model ", ACM, pp. 7-10, 2009.*

Halambi et al., "A Customizable Compiler Framework for Embedded Systems," University of California, http://www.ics.uci.edu/~avirali/papers/customizableCompiler.pdf, Mar. 20, 2001, 6 pages.

* cited by examiner

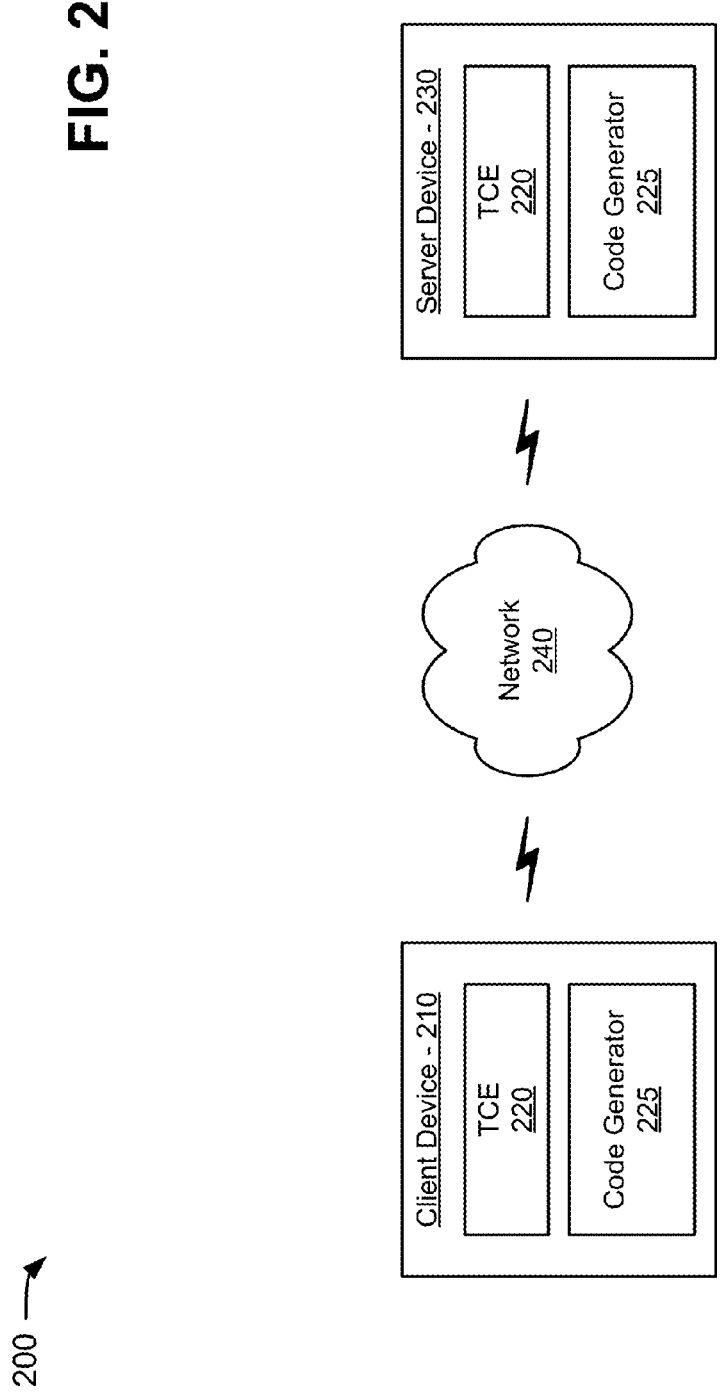

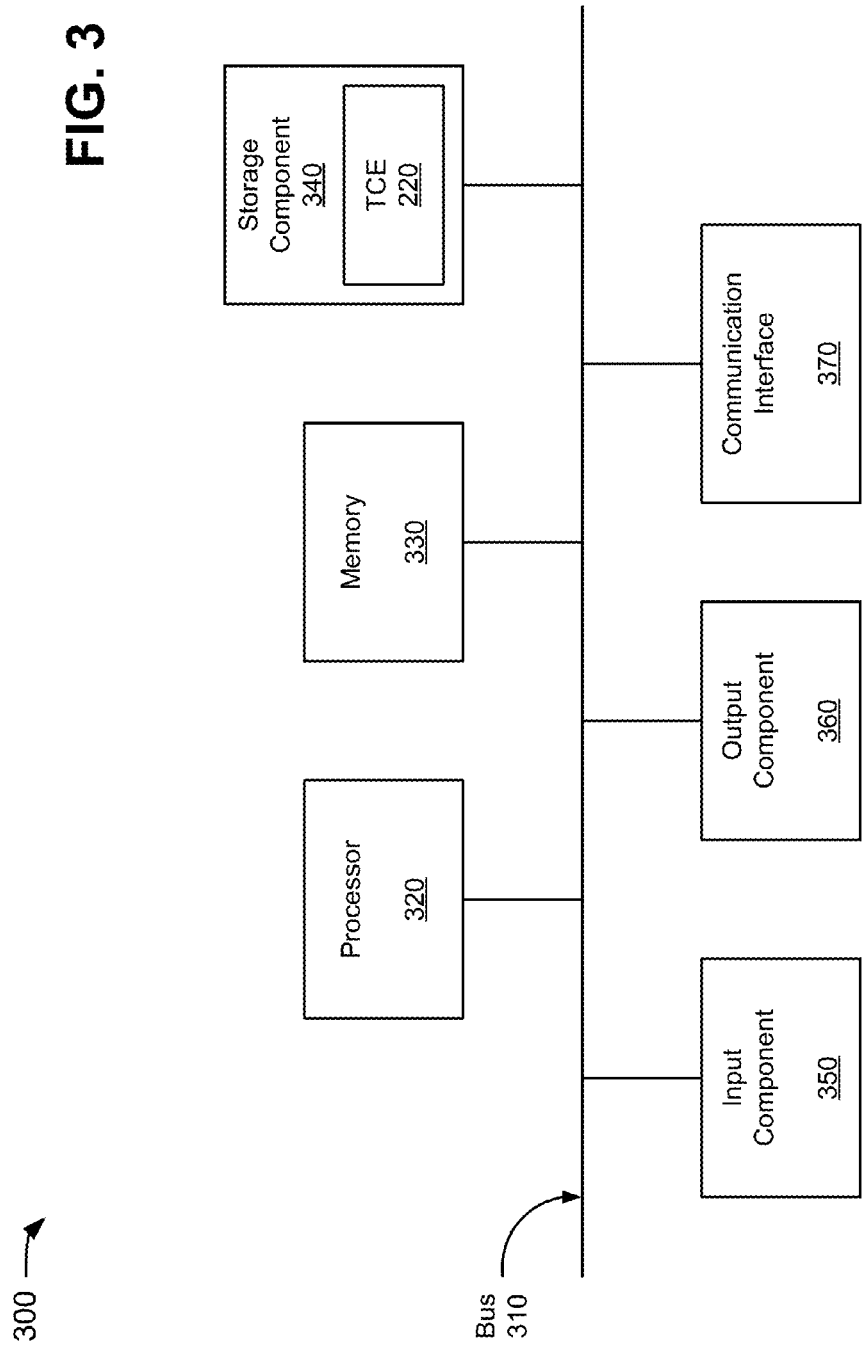

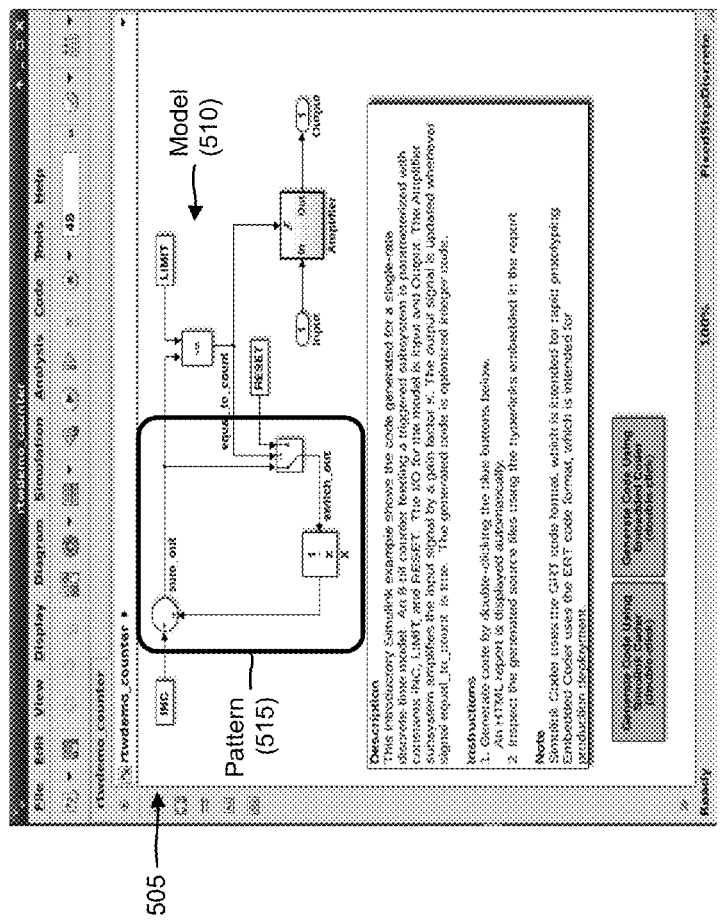

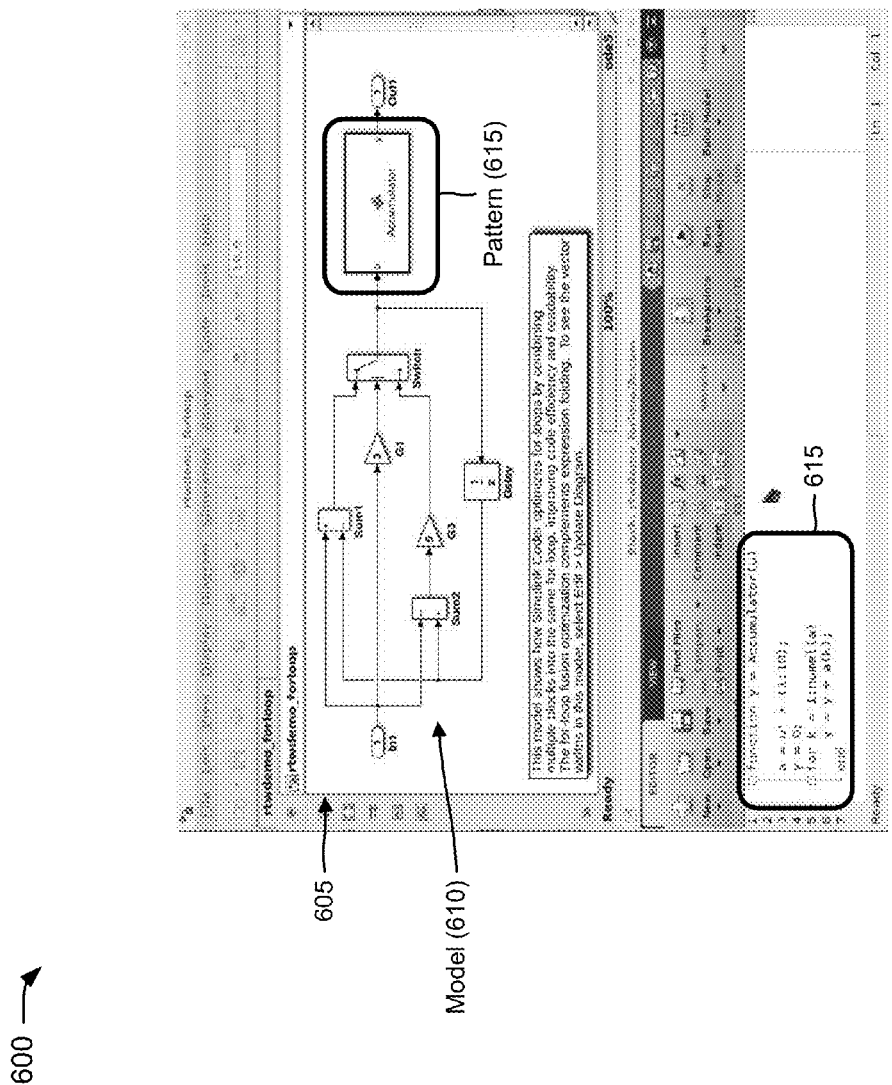

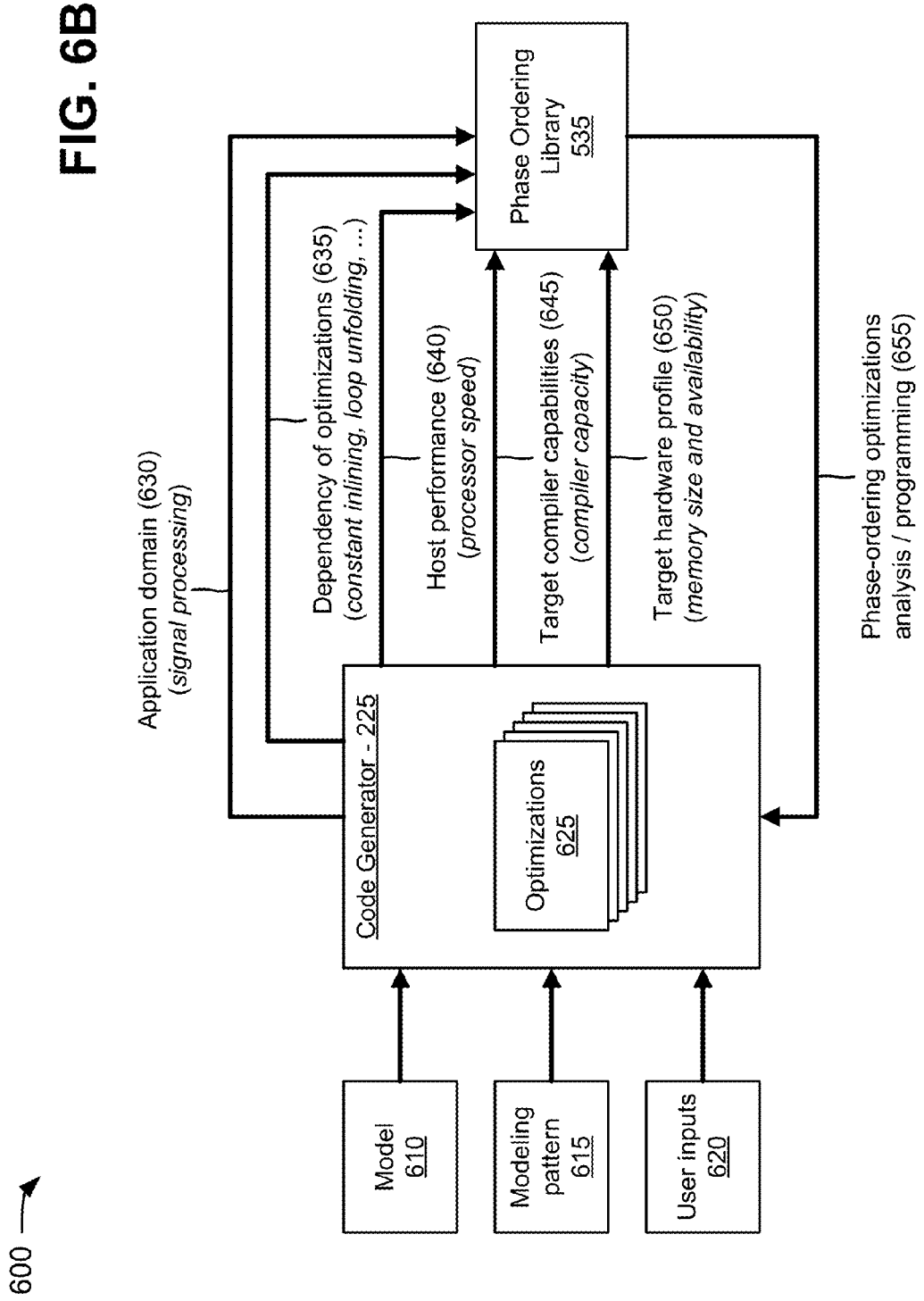

AUTOMATIC GENERATION OF DOMAIN-AWARE PHASE ORDERING FOR EFFECTIVE OPTIMIZATION OF CODE FOR A MODEL

RELATED APPLICATION

This application is a continuation-in-part of U.S. patent application Ser. No. 14/264,474, filed on Apr. 29, 2014, the entire contents of which are hereby incorporated by reference.

BRIEF DESCRIPTION OF THE DRAWINGS

FIG. 2 is a diagram of an example environment in which systems and/or methods, described herein, may be implemented;

FIG. 3 is a diagram of example components of one or more devices of FIG. 2;

FIGS. 5A-5D are diagrams of an example relating to the example process shown in FIG. 4; and FIGS. 6A and 6B are diagrams of another example relating to the example process shown in FIG. 4.

DETAILED DESCRIPTION

The following detailed description of example implementations refers to the accompanying drawings. The same reference numbers in different drawings may identify the same or similar elements.

A technical computing environment (TCE) may include a computing environment that allows users to perform tasks related to disciplines, such as, but not limited to, mathematics, science, engineering, medicine, business, or the like, more efficiently than if the tasks were performed in another type of computing environment, such as an environment that required the user to develop code in a conventional programming language, such as C++, C, Fortran, Pascal, or the like. The TCE may use an array, a vector, and/or a matrix as basic elements.

A user may utilize the TCE to generate models, such as a textual model; a graphical model with one or more model elements (e.g., blocks), one or more input signals (e.g., data), and one or more output signals (e.g., data); a combination of a textual model and a graphical model; or the like. Each of the blocks may represent a physical device, a subsystem, another model, or the like of a system being modeled. In some models, signals may be generated from various blocks and may point to other blocks of the model. The user may arrange or group one or more blocks of the model into subsystem blocks. The user may utilize a code generator to define and generate code based on the model. However, the code generator may not effectively optimize the code based on the model due to the arrangement of the model.

Figure 1A:
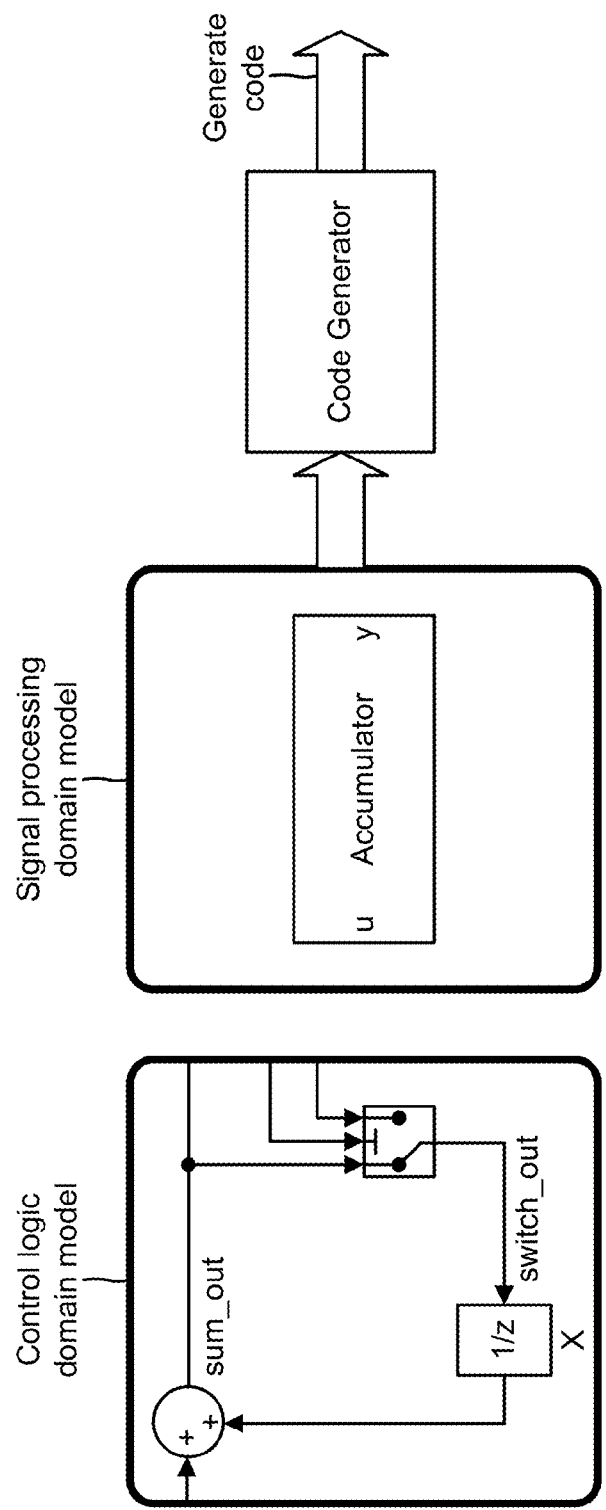
FIGS. 1A and 1B are diagrams of an overview of an example implementation described herein.
Figure 1B:
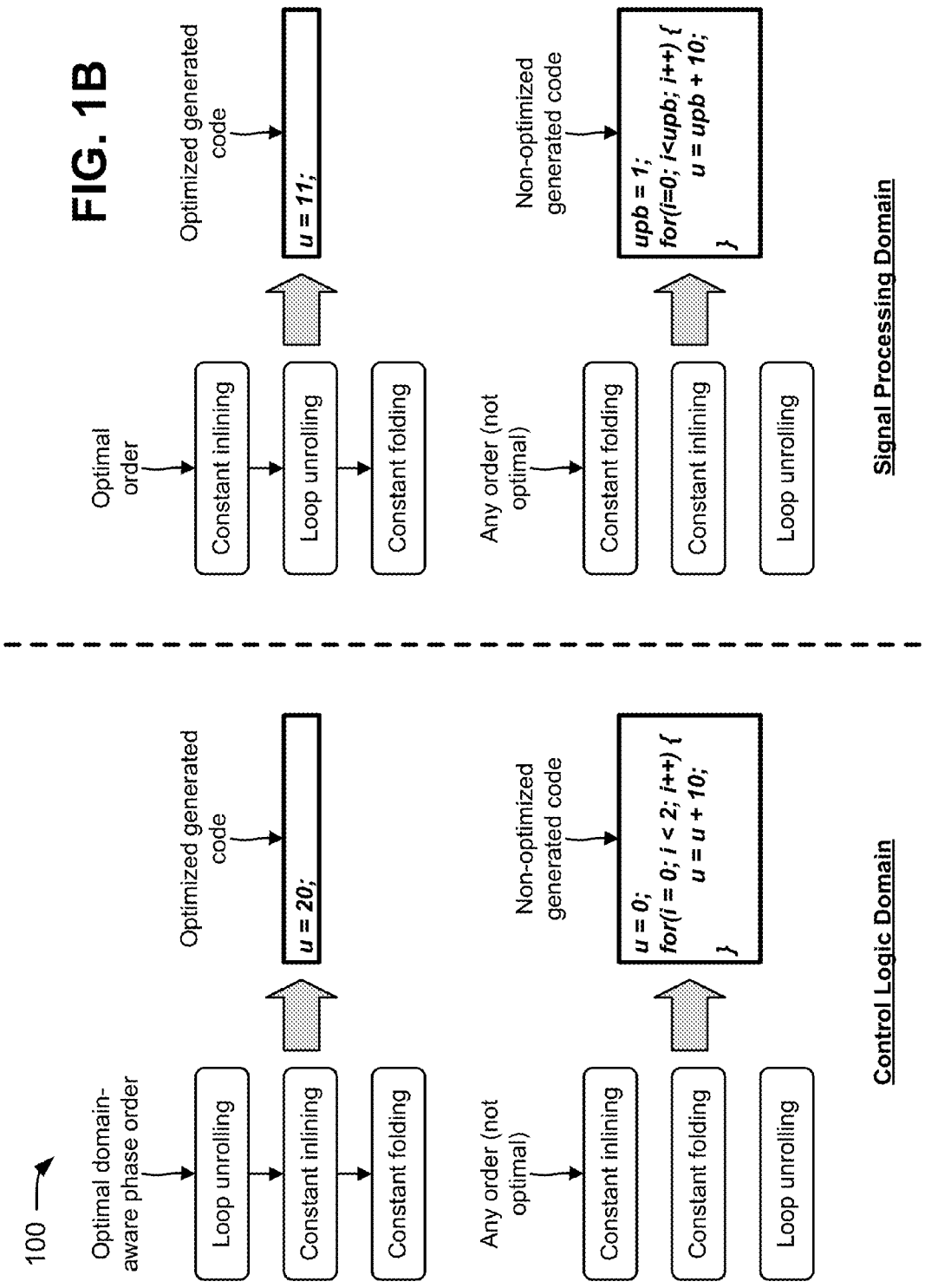

FIGS. 1A and 1B are diagrams of an overview of an example implementation 100 described herein. With reference to FIG. 1A, a user may utilize a TCE (e.g., a portion of the TCE that enables models to be created), provided on a computing device, to generate models of different entities (e.g., a control system, an autopilot system, a cruise control system in a car, antilock brakes in a car, a cell phone, or the like). The models may be associated with different domains (e.g., physical systems), such as an electrical domain, a mechanical domain, a hydraulic domain, a control logic domain, a signal processing domain, or the like. The user may construct, reuse, and integrate common low-level designs, in a model, with blocks, algorithms, and components. The common low-level designs may represent specific tasks, such as startup, accumulator, filter, shutdown, or the like, and may be collectively referred to as modeling patterns.

As shown in FIG. 1A, the user may utilize the TCE to create, receive, and/or display a control logic domain model and a signal processing domain model. The control logic domain model may include multiple blocks and signals provided between the blocks. The control logic domain model may include a single-rate discrete-time model with a summation block that performs addition, a delay block (X), a switch block, and/or other blocks. The signal processing domain model may include an accumulator block and/or other blocks. Assume that the user wishes to generate code for the control logic domain model and the signal processing domain model, and provides a command (e.g., by selecting a generate code button) to instruct the TCE to provide the control logic domain model and the signal processing domain model to a code generator. As further shown in FIG. 1A, the code generator may generate code based on the control logic domain model and may generate code based on the signal processing domain model.

The user may wish the generated code to be efficient code since inefficient code may cause the physical systems, represented by the control logic domain model and the signal processing domain model, to be inefficient. Additional resources may be required to build the inefficient physical systems, than required to build efficient physical systems, which may increase costs for the physical systems.

In some implementations, the code generator may utilize optimization techniques to convert the control logic domain model and the signal processing domain model to optimized generated code. For example, the code generator may utilize loop unrolling, constant inlining, constant folding, or the like, optimization techniques to generate optimal code. As used herein, the term "optimal" is to be construed as meaning that optimization techniques have been applied to the code. For example, loop unrolling may optimize an execution speed of the generated code by reducing or eliminating instructions that control a loop, such as pointer arithmetic and end of loop tests on each iteration, branch penalties, or the like. Constant inlining may improve speed and memory usage during execution of the generated code. For example, constant inlining may enable the code generator to eliminate superfluous signals between blocks of the model from which the code is generated. Constant folding may enable the code generator to accurately propagate constants and simultaneously remove dead code from the generated code. For example, constant folding may enable recognition and evaluation of constant expressions, in the generated code, at compile time rather than at execution.

Typically, the code generator performs such optimization techniques in any order, which may cause the code generator to generate non-optimized or inefficient code. For example, as shown in the bottom left portion of FIG. 1B, the code generator may utilize constant inlining, constant folding, and loop unrolling in no particular order, and may generate non-optimal code for the control logic domain model. As shown in the bottom right portion of FIG. 1B, the code generator may utilize constant folding, constant inlining, and loop unrolling in no particular order, and may generate non-optimal code for the signal processing domain model.

In some implementations, the code generator may determine an optimal order (e.g., an optimal domain-aware phase order) of the optimization techniques based on a domain associated with a model, and may generate optimal code for the model based on performance of the optimization techniques in the optimal domain-aware phase order. For example, as shown in the upper left portion of FIG. 1B, the code generator may determine an optimal order for the optimization techniques (e.g., for the control logic domain model) to be loop unrolling, constant inlining, and constant folding. Based on the optimal order, the code generator may first apply loop unrolling to the control logic domain model, then may apply constant inlining to the control logic domain model, and finally may apply constant folding to the control logic domain model. Application of the optimization techniques in the optimal order may enable the code generator to generate optimal code (e.g., u=20) for the control logic domain model. As shown in the upper right portion of FIG. 1B, the code generator may determine an optimal order for the optimization techniques (e.g., for the signal processing domain model) to be constant inlining, loop unrolling and constant folding. Based on the optimal order, the code generator may first apply constant inlining to the signal processing domain model, then may apply loop unrolling to the signal processing domain model, and finally may apply constant folding to the signal processing domain model. Application of the optimization techniques in the optimal order may enable the code generator to generate optimal code (e.g., u=11) for the signal processing domain model.

Systems and/or methods, described herein, may automatically generate a domain-aware order for optimization techniques utilized to generate code for a model. The domain-aware order for the optimization techniques may be applied to different application domains of a model; different use cases of modeling constructs; different design and implementation of modeling constructs; different efficiency metrics of the generated code; different time and memory requirements for the generated code; or the like. The systems and/or methods may generate efficient code that is tailored towards particular efficiency metrics, and may enable control of time and memory used to generate the code.

FIG. 2 is a diagram of an example environment 200 in which systems and/or methods described herein may be implemented. As shown in FIG. 2, environment 200 may include a client device 210, which may include a technical computing environment (TCE) 220 and a code generator 225. In some implementations, code generator 225 may be part of TCE 220. Furthermore, environment 200 may include a server device 230, which may include TCE 220 and code generator 225, and a network 240. Devices of environment 200 may interconnect via wired connections, wireless connections, or a combination of wired and wireless connections.

Client device 210 may include one or more devices capable of receiving, generating, storing, processing, executing, and/or providing information in a manner described herein. For example, client device 210 may include a computing device, such as a desktop computer, a laptop computer, a tablet computer, a handheld computer, a server, a mobile phone (e.g., a smart phone, a radiotelephone, or the like), or a similar device. In some implementations, client device 210 may receive information from and/or transmit information to server device 230.

TCE 220 may be provided within a computer-readable medium of client device 210. Alternatively, or additionally, TCE 220 may be provided in another device (e.g., server device 230) that is accessible by client device 210. TCE 220 may include hardware or a combination of hardware and software that provides a computing environment that allows users to perform tasks related to disciplines, such as, but not limited to, mathematics, science, engineering, medicine, business, or the like, more efficiently than if the tasks were performed in another type of computing environment, such as an environment that required the user to develop code in a conventional programming language, such as C++, C, Fortran, Pascal, or the like. In some implementations, TCE 220 may include a modeling language (e.g., the M language, a MATLAB® language, a MATLAB-compatible language, a MATLAB-like language, a textual modeling language, a graphical modeling language, a dynamically-typed programming language, an array-based programming language, or the like) that can be used to express problems and/or solutions in mathematical notations.

For example, TCE 220 may use an array as a basic element, where the array may not require dimensioning. These arrays may be used to support array-based programming (e.g., modeling) where an operation may apply to an entire set of values included in the arrays. Array-based programming may allow array-based operations to be treated as high-level programming (e.g., modeling) that may allow, for example, operations to be performed on entire aggregations of data without having to resort to explicit loops of individual non-array operations. In some implementations, TCE 220 may provide high level programming with a dynamically-typed language or an array-based programming language that may be a form of modeling. In some implementations, the array-based programming language may be utilized to create models. In addition, TCE 220 may be adapted to perform matrix and/or vector formulations that can be used for data analysis, data visualization, application development, simulation, modeling, algorithm development, or the like. These matrix and/or vector formulations may be used in many areas, such as statistics, image processing, signal processing, control design, life sciences modeling, discrete event analysis and/or design, state based analysis and/or design, or the like. In some implementations, TCE 220 may provide high level programming with a dynamically-typed language or an array-based language that may be a form of modeling.

TCE 220 may further provide mathematical functions and/or graphical tools (e.g., for creating plots, surfaces, images, volumetric representations, or the like). In some implementations, TCE 220 may provide these functions and/or tools using toolboxes (e.g., toolboxes for signal processing, image processing, data plotting, parallel processing, or the like). In some implementations, TCE 220 may provide these functions as block sets or in another way, such as via a library, or the like.

TCE 220 may be implemented as a text-based environment (e.g., MATLAB software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dassault Systemes; or the like); a graphically-based environment (e.g., Simulink® software, Stateflow® software, SimEvents® software, Simscape™ software, or the like, by The MathWorks, Inc.; VisSim by Visual Solutions; LabView® by National Instruments; Dymola by Dassault Systemes; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; aspects of a Unified Modeling Language (UML) or SysML environment; or the like); or another type of environment, such as a hybrid environment that includes one or more of the above-referenced text-based environments and one or more of the above-referenced graphically-based environments.

TCE 220 may include a programming language (e.g., the MATLAB language) that may be used to express problems and/or solutions in mathematical notations. The programming language may be dynamically typed and/or array-based. In a dynamically typed array-based programming language, data may be contained in arrays and data types of the data may be determined (e.g., assigned) at program execution time. In some implementations, the arrays may include a cell array. A cell array may include a data type with indexed data containers called cells. Each cell may contain any type of data. A cell array may commonly contain lists of text strings, combinations of text and numbers from spreadsheets or text files, or numeric arrays of different sizes.

For example, suppose a program, written in a dynamically typed array-based programming language, includes the following statements:
A='hello'
A=int32([2, 3])
A=[1.1, 2.2, 3.3].

Now suppose the program is executed, for example, in TCE 220. During run-time, when the statement "A='hello'" is executed the data type of variable "A" may be a string data type. Later when the statement "A=int32([2, 3])" is executed the data type of variable "A" may be a 1-by-2 array containing elements whose data type are 32 bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based programming language may be contained in an array. Moreover, the data type of the data may be determined during execution of the program. Thus, in a dynamically type array-based programming language, data may be represented by arrays and data types of data may be determined at run-time.

In some implementations, TCE 220 may provide mathematical routines and a high-level programming language suitable for non-professional programmers and may provide graphical tools that may be used for creating plots, surfaces, images, volumetric representations, or other representations. TCE 220 may provide these routines and/or tools using toolboxes (e.g., toolboxes for signal processing, image processing, data plotting, parallel processing, or the like). TCE 220 may also provide these routines in other ways, such as, for example, via a library, local or remote database (e.g., a database operating in a computing cloud), remote procedure calls (RPCs), and/or an application programming interface (API). TCE 220 may be configured to improve runtime performance when performing computing operations. For example, TCE 220 may include a just-in-time (JIT) compiler, and may be used with a complex instruction set computer (CISC), reduced instruction set computing (RISC), a microprocessor without interlocked pipeline stages (MIPS), quantum computing, or the like.

A dynamic system (either natural or man-made) may be a system whose response at any given time may be a function of its input stimuli, its current state, and a current time. Such systems may range from simple to highly complex systems. Natural dynamic systems may include, for example, a falling body, the rotation of the earth, bio-mechanical systems (muscles, joints, or the like), bio-chemical systems (gene expression, protein pathways), weather, and climate pattern systems, and/or any other natural dynamic system. Man-made or engineered dynamic systems may include, for example, a bouncing ball, a spring with a mass tied on an end, automobiles, aircrafts, control systems in major appliances, communication networks, audio signal processing systems, and a financial or stock market, and/or any other man-made or engineered dynamic system.

The system represented by a model may have various execution semantics that may be represented in the model as a collection of modeling entities, often referred to as blocks. A block may generally refer to a portion of functionality that may be used in the model. The block may be represented graphically, textually, and/or stored in some form of internal representation. Also, a particular visual depiction used to represent the block, for example in a graphical block diagram, may be a design choice.

A block may be hierarchical in that the block itself may include one or more blocks that make up the block. A block including one or more blocks (sub-blocks) may be referred to as a subsystem block. A subsystem block may be configured to represent a subsystem of the overall system represented by the model. A subsystem block may be a masked subsystem block that is configured to have a logical workspace that contains variables only readable and writeable by elements contained by the subsystem block.

A graphical model (e.g., a functional model) may include entities with relationships between the entities, and the relationships and/or the entities may have attributes associated with them. The entities may include model elements, such as blocks and/or ports. The relationships may include model elements, such as lines or signals (e.g., connector lines) and references (e.g., textual labels). The attributes may include model elements, such as value information and meta information for the model element associated with the attributes. A graphical model may be associated with configuration information. The configuration information may include information for the graphical model, such as model execution information (e.g., numerical integration schemes, fundamental execution period, or the like), model diagnostic information (e.g., whether an algebraic loop should be considered an error or result in a warning), model optimization information (e.g., whether model elements should share memory during execution), model processing information (e.g., whether common functionality should be shared in code that is generated for a model), or the like.

In some implementations, a graphical model may have executable semantics and/or may be executable. An executable graphical model may be a time-based block diagram model. A time-based block diagram model may include, for example, blocks connected by lines (e.g., connector lines). The blocks may include elemental dynamic systems such as a differential equation system (e.g., to specify continuous-time behavior), a difference equation system (e.g., to specify discrete-time behavior), an algebraic equation system (e.g., to specify constraints), a state transition system (e.g., to specify finite state machine behavior), an event based system (e.g., to specify discrete event behavior), or the like. The lines may represent signals (e.g., to specify input/output relations between blocks or to specify execution dependencies between blocks), variables (e.g., to specify information shared between blocks), physical connections (e.g., to specify electrical wires, pipes with volume flow, rigid mechanical connections, or the like), or the like. The attributes may consist of meta information such as sample times, dimensions, complexity (whether there is an imaginary component to a value), data type, or the like, associated with the model elements.

In a time-based block diagram, ports may be associated with blocks. A relationship between two ports may be created by connecting a line (e.g., a connector line) between the two ports. Lines may also, or alternatively, be connected to other lines, for example by creating branch points. For instance, three or more ports can be connected by connecting a line to each of the ports, and by connecting each of the lines to a common branch point for all of the lines. A common branch point may be a dynamic system, for example, for the lines that represent physical connections (e.g., by summing all variables of a certain type to 0 or by equating all variables of a certain type). A port may be an input port, an output port, a non-causal port, an enable port, a trigger port, a function-call port, a publish port, a subscribe port, an exception port, an error port, a physics port, a power port an entity flow port, a data flow port, a control flow port, or the like.

In some implementations, TCE 220 may receive a model, and may provide a user with an option to generate code, based on the model, for target hardware. If the user elects to utilize the option, TCE 220 may provide the model to code generator 225.

Code generator 225 may be provided in client device 210 or may be provided in another device (e.g., server device 230) that is accessible by client device 210. In some implementations, code generator 225 may generate an intermediate representation (IR) based on the model received by TCE 220. An intermediate representation or IR may include a translation of a model, a representation of a model (e.g., a data structure that may be stored in memory, a file, a database, and/or other storage media), or the like. An IR may be constructed from input data contained within a source language (e.g., a language used by a model) and from which part or all of output data contained in a target language (e.g., generated code) may be constructed. An IR may include a control flow graph (CFG), a data flow graph (DFG), a hybrid graph (e.g., a graph that includes a CFG and a DFG), and/or another representation that preserves properties of information in the source language. An IR may allow for serial and/or parallel processing of the representation in the source language within the IR. The use of an IR may permit translation of a representation in a source language into a representation in a target language such that a system implementation may be generated from an initial system model.

In some implementations, an IR may be generated from a model, created via TCE 220, before emitting code represented by a programming language (e.g., C, C++, Fortran, Java™, or the like), a hardware description language (e.g., Verilog or the like), a scripting language (e.g., Perl, Python, Javascript™, or the like), and/or a machine or assembly language. In some implementations, code generator 225 may parse a model into syntactical components, and may use the syntactical components to construct an IR such that the IR may represent the semantics of the model. In some implementations, code generator 225 may allow a user to develop an IR for user-specified elements. The IR may be based on computations to be performed, and may not follow model elements (e.g., as they are presented in a model). The IR may permit optimizations to be applied across multiple elements of a model.

In one implementation, code generator 225 may identify a region of operations as belonging to a specific domain, and may determine dependencies of code generation optimizations for such a domain. For example, a region of operations may contain blocks of a common type. The common type of blocks (e.g., certain signal processing blocks) may share similar algorithmic characteristics (e.g., loops parameterized or templatized in a certain manner) either because of the application domain requirements or the programming habits of the developers of the blocks. The algorithmic characteristics may be used to form an effective an optimization sequence. As another example, a region of operations may contain a particular use pattern of a collection of modeling and/or programming constructs. The particular use pattern (e.g., control system common low-level components) may result in certain code patterns (e.g., recursion or a state machine implementation structured in a certain way) in the generated code. The certain code patterns may be prone toward certain optimization sequences. Additionally, the region of operations may include different levels of granularity that may be used to identify useful domains and patterns.

In some implementations, code generator 225 may determine performance characteristics of a host device (e.g., client device 210, server device 230, or the like), and may determine capabilities of a target compiler for the generated code. In some implementations, code generator 225 may determine a target hardware profile for the generated code to be executed, and may identify an order for the code generation optimizations based on the application domain, the dependency of the code generation optimizations, the host device performance characteristics, the target compiler capabilities, and/or the target hardware profile. In some implementations, code generator 225 may generate optimal code for the model based on the identified order for the code generation optimizations.

In some implementations, the target hardware may include a homogeneous hardware platform of the same type of processing components (e.g., a central processing unit (CPU), a graphical processing unit (GPU), an application-specific integrated circuit (ASIC), a field-programmable gate array (FPGA), or the like). A homogeneous hardware platform may include a combination of the same type of computing components (e.g., the same type of processing components). In some implementations, the target hardware may include a heterogeneous hardware platform of different types of processing components. A heterogeneous hardware platform may include a combination of different types of computing components (e.g., different types of computing cores, computing cores combined with signal processing intrinsics, computing cores combined with FPGAs, or the like).

Server device 230 may include one or more devices capable of receiving, generating, storing, processing, executing, and/or providing information in a manner described herein. For example, server device 230 may include a computing device, such as a server, a desktop computer, a laptop computer, a tablet computer, a handheld computer, or a similar device. In some implementations, server device 230 may host TCE 220 and/or code generator 225.

Network 240 may include one or more wired and/or wireless networks. For example, network 240 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an opportunistic network, an intranet, the Internet, a fiber optic-based network, and/or a combination of these or other types of networks.

The number and arrangement of devices and/or networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

FIG. 3 is a diagram of example components of a device 300, which may correspond to client device 210 and/or server device 230. In some implementations, each of client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a path that permits communication among the components of device 300. Processor 320 may include a processor (e.g., a central processing unit, a graphics processing unit, an accelerated processing unit, or the like), a microprocessor, a digital signal processor (DSP), and/or any processing component (e.g., a field-programmable gate array (FPGA), an application-specific integrated circuit (ASIC), or the like) that interprets and/or executes instructions, and/or that is designed to implement a particular function. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320. In some implementations, processor 320 may include, for example, an ASIC.

Storage component 340 may store information and/or software related to the operation and use of device 300. For example, storage component 340 may include a hard disk (e.g., a magnetic disk, an optical disk, a magneto-optic disk, a solid state disk, or the like), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits a user to input information to device 300 (e.g., a touch screen display, a keyboard, a keypad, a mouse, a button, a switch, or the like). Output component 360 may include a component that outputs information from device 300 (e.g., a display, a speaker, one or more light-emitting diodes (LEDs), or the like).

Communication interface 370 may include a transceiver-like component, such as a transceiver and/or a separate receiver and transmitter that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform various operations described herein. Device 300 may perform these operations in response to processor 320 executing software instructions included in a computer-readable medium, such as memory 330 and/or storage component 340. A computer-readable medium is defined as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

Figure 4:
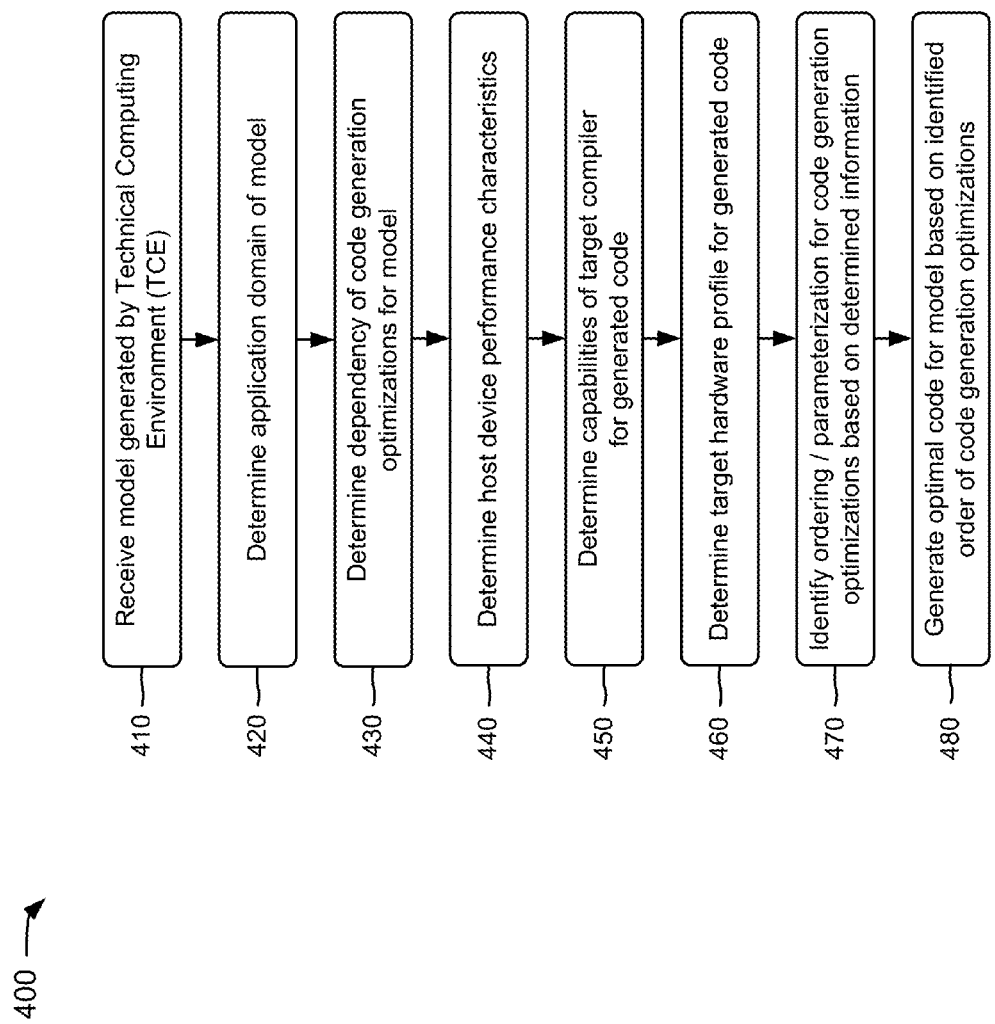
FIG. 4 is a flow chart of an example process for automatically generating domain-aware phase ordering for effective optimization of code for a model.

FIG. 4 is a flow chart of an example process 400 for automatically generating domain-aware phase ordering for effective optimization of code for a model. In some implementations, one or more process blocks of FIG. 4 may be performed by client device 210. In some implementations, one or more process blocks of FIG. 4 may be performed by another device or a group of devices separate from or including client device 210, such as server device 230.

As shown in FIG. 4, process 400 may include receiving a model generated by a technical computing environment (TCE) (block 410). For example, a user may utilize client device 210 and TCE 220 to define and create a model and/or to display the model. In some implementations, the user may utilize client device 210 to receive the model from another device (e.g., server device 230) or to retrieve the model from memory associated with client device 210. In some implementations, the model may include a graphical model with one or more blocks, one or more input signals (e.g., data), and one or more output signals (e.g., data). In some implementations, each of the blocks may represent a portion of a system being modeled. In some implementations, signals may be generated from various blocks and may point to other blocks of the model. In some implementations, the user may utilize TCE 220 to group certain blocks together into subsystem blocks. Each subsystem block may be defined by a user-defined boundary that is provided around the blocks grouped together in the subsystem block.

As further shown in FIG. 4, process 400 may include determining an application domain of the model (block 420). For example, the user may instruct TCE 220 and code generator 225 to generate code based on the model. In some implementations, TCE 220 may cause client device 210 to display, to the user, an option to generate code based on the model, and the user may select the option to generate code based on the model. Based on the selection, code generator 225 may generate code based on the model. In some implementations, the code may not be emitted prior to TCE 220 and/or code generator 225 analyzing and/or optimizing the code.

In some implementations, code generator 225 may determine an application domain of the model so that a domain-aware phase order may be determined for effective optimization of the generated code. For example, the model or a region of the model may be associated with different application domains or sub-domains (e.g., physical systems), such as an electrical domain, a mechanical domain, a hydraulic domain, a control logic domain, a signal processing domain, or the like. Code generator 225 may analyze the model to determine the application domain of the model or regions of the model. For example, if a region of the model includes control logic blocks and/or signals, code generator 225 may determine that the region of the model is associated with the control logic domain. In another example, if a region of the model includes signal processing blocks and/or signals, code generator 225 may determine that the region of the model is associated with the signal processing domain. In some implementations, code generator 225 may determine that one or more different regions of the model are associated with one or more different application domains. For example, a first region of the model may be associated with the mechanical domain, and a second region of the model may be associated with the electrical domain. The different domains or sub-domains may have different implications for the code generated from them, such as how algorithms and data dependencies are modeled, how constants and temporary variables are used, and how computation complexity and component boundaries are laid out. As such, code generator 225 may identify effective and different optimization orderings for these domains.

In some implementations, code generator 225 may detect modeling patterns in the model based on specific usage of modeling constructs, blocks, signals, algorithms, componentization, connectivity, or the like. In some implementations, code generator 225 may determine an effectiveness of an order for code generation optimizations (e.g., loop unrolling, constant folding, or the like) based on the determined application domain of the model and/or the detected modeling patterns of the model.

As further shown in FIG. 4, process 400 may include determining a dependency of code generation optimizations for the model (block 430). For example, code generator 225 may determine a dependency of code generation optimizations for the model. In some implementations, code generator 225 may identify one or more code generation optimizations (e.g., constant inlining, constant folding, or the like) for the model, and may determine whether each of the identified code generation optimizations is dependent on other code generation optimizations, independent of other code generation optimizations, or the like. For example, assume that code generator 225 determines that constant folding and constant inlining may be used as code generation optimizations, and that performance of constant folding makes performance of constant inlining more efficient. In such an example, code generator 225 may determine that constant folding and constant inlining share a dependency. In another example, assume that code generator 225 determines that loop unrolling and constant folding may be used as code generation optimizations, and that performance of loop unrolling does not affect performance of constant folding, and vice versa. In such an example, code generator 225 may determine that loop unrolling and constant folding do not share a dependency.

In some implementations, constant inlining may enable code generator 225 to improve speed and memory usage during execution of code generated based on the model (referred to herein as "generated code"). In some implementations, code generator 225 may utilize constant inlining to eliminate superfluous signals between blocks of the model. For example, assume that the model utilizes a signal (e.g., a call instruction) to invoke a function in a block. In such an example, the constant inlining may enable the content of the function to be invoked without the call instruction (e.g., by eliminating the signal from the model), which may improve memory usage and/or execution speed of the generated code.

In some implementations, loop unrolling may enable code generator 225 to optimize an execution speed of the generated code by reducing or eliminating instructions that control a loop, such as pointer arithmetic and end of loop tests on each iteration, branch penalties, or the like. In some implementations, constant folding may enable code generator 225 to accurately propagate constants and simultaneously remove dead code from the generated code. For example, constant folding may enable recognition and evaluation of constant expressions, in the generated code, at compile time rather than at execution.

In some implementations, code generator 225 may perform a code motion optimization to reduce a frequency with which a computation is performed by the model. For example, the code motion optimization may enable code generator 225 to group one or more of the blocks of the model together so that the blocks may be executed in parallel. In another example, the code motion optimization may enable code generator 225 to move statements or expressions of the generated code outside of a loop without affecting the semantics of the generated code. This may enable the statements or expressions to be executed less frequently, which may increase the execution speed of the generated code.

As further shown in FIG. 4, process 400 may include determining host device performance characteristics (block 440). For example, code generator 225 may determine performance characteristics associated with a host device (e.g., client device 210 or server device 230) that includes code generator 225. In some implementations, the performance characteristics may include performance characteristics, of the host device (e.g., time and/or resource requirements), that are required to generate the code for the model. In some implementations, the performance characteristics may include a time required for the host device to generate the code for the model, usage of the host device's memory required to generate the code, usage of the host device's processor required to generate the code, or the like.

In some implementations, the performance characteristics may include time and/or resource usage of the host device required to perform the determined code generation optimizations for the model. For example, assume that the loop unrolling optimization requires a first amount of time $T_1$ (e.g., in seconds, minutes, hours, or the like) for the host device to complete and utilizes a first amount $M_1$ (e.g., a percentage) of a memory of the host device. Further, assume that the constant inlining optimization requires a second amount of time $T_2$ for the host device to complete and utilizes a second amount $M_2$ of the memory of the host device. In such an example, code generator 225 may determine that the code generation optimizations require a particular amount of time (e.g., $T_1+T_2$) of the host device, and a particular amount of memory usage (e.g., $M_1+M_2$) of the host device.

As further shown in FIG. 4, process 400 may include determining capabilities of a target compiler for the generated code (block 450). For example, code generator 225 may determine capabilities of a target compiler, provided for a target device (e.g., client device 210 or server device 230), for the generated code. In some implementations, code generator 225 may utilize code efficiency metrics to determine capabilities (e.g., effectiveness) of the target compiler for the generated code. In some implementations, the code efficiency metrics may include metrics utilized to measure an efficiency of the generated code created by code generator 225. In some implementations, the code efficiency metrics may include metrics that determine a number of global variables in the generated code, stack utilization by the generated code, a number of data copies in the generated code, or the like.

In some implementations, a global variable may include a variable that is accessible in multiple portions of the generated code. A global variable may be modified in any portion of the generated code, and any portion of the generated code may depend on the global variable. Therefore, a global variable may create mutual dependencies in the generated code, which may increase the complexity of the generated code. In some implementations, code generator 225 may attempt to create generated code that minimizes the number of global variables in the generated code. For example, code generator 225 may eliminate and/or modify code that includes a number of global variables greater than a threshold value (e.g., two, three, four, or the like).

In some implementations, stack utilization may include utilization of a stack to store a return address of functions in the generated code, registers associated with the generated code, local variables (e.g., local arrays, structures, classes, or the like) associated with generated code, or the like. In some implementations, code generator 225 may attempt to create generated code that minimizes stack utilization. For example, code generator 225 may eliminate and/or modify code that utilizes a stack more than a threshold amount (e.g., in bytes, kilobytes, or the like).

In some implementations, one or more functions of the blocks of the model may cause data copies to be in the generated code provided by code generator 225, which may increase memory usage by the generated code. For example, a function of a block may produce a copy of output data for every destination to which the output data is to be passed. Such data copies may be temporarily stored in memory associated with the target device. In some implementations, code generator 225 may attempt to create generated code that minimizes the number of data copies in the generated code. For example, code generator 225 may eliminate and/or modify code that includes a number of data copies greater than a threshold value (e.g., two, three, four, or the like).

As further shown in FIG. 4, process 400 may include determining a target hardware profile for the generated code (block 460). For example, code generator 225 may determine a profile of target hardware (e.g., a cache, a memory, a processor, or the like), provided on a target device (e.g., client device 210 or server device 230), for the generated code. In some implementations, code generator 225 may utilize metrics associated with the target hardware to determine the profile of the target hardware for the generated code.

In some implementations, the metrics associated with the target hardware may include metrics utilized to measure performance characteristics of the target hardware on which the generated code is to be executed. For example, the target hardware metrics may include metrics that determine an instruction set of the target hardware, a register set of the target hardware, a cache size of the target hardware, RAM and/or ROM sizes of the target hardware, parallel computing capabilities of the target hardware, power consumption, or the like.

In some implementations, the instruction set of the target hardware may include information associated with native data types, addressing modes, a memory architecture, interrupt and exception handling, input/output components, or the like, of the target hardware. In some implementations, code generator 225 may attempt to create generated code that best utilizes the instruction set of the target hardware. For example, code generator 225 may eliminate and/or modify code that over-utilizes or underutilizes the addressing modes, the input/output components, or the like, of the target hardware.

In some implementations, the register set of the target hardware may include information associated with a set of registers of the target hardware. A register may include storage available as part of a processor (e.g., processor 320, FIG. 3). In some implementations, code generator 225 may attempt to generate code that best utilizes the register set of the target hardware. For example, code generator 225 may eliminate and/or modify code that over-utilizes or underutilizes the registers of the target hardware.

In some implementations, the cache size of the target hardware may include information associated with a size of cache memory of the target hardware. In some implementations, code generator 225 may attempt to generate code that best utilizes the cache memory of the target hardware. For example, code generator 225 may eliminate and/or modify code that over-utilizes or underutilizes the cache memory of the target hardware.

In some implementations, code generator 225 may attempt to generate code that best utilizes the RAM and/or the ROM of the target hardware. For example, code generator 225 may eliminate and/or modify code that over-utilizes or underutilizes the RAM and/or the ROM of the target hardware.

In some implementations, the parallel computing capabilities of the target hardware may include information associated with parallel computing (e.g., via multiple cores, multiple processes or threads, distributed parallel computing devices, or the like) capabilities of the target hardware. In some implementations, code generator 225 may attempt to generate code that best utilizes the parallel computing capabilities of the target hardware. For example, code generator 225 may determine that particular code cannot be executed in parallel. In such an example, code generator 225 may eliminate and/or modify the particular code so that the generated code may be executed in parallel.

As further shown in FIG. 4, process 400 may include identifying an ordering and parameterization for the code generation optimizations based on the determined information (block 470). For example, code generator 225 may identify optimal ordering and parameterization for the code generation optimizations (e.g., an optimal domain-aware phase order) based on the determined information. In some implementations, code generator 225 may identify the optimal order for the code generation optimizations, for each application domain in the model, based on the dependency of the code generation optimizations, the host device performance characteristics, the capabilities of the target compiler, and/or the target hardware profile.

For an example of the ordering of the optimizations, based on the determined information, assume that code generator 225 determines that performance of a loop unrolling optimization improves the performance of a constant folding optimization, and subsequently that performance of the constant folding optimization improves the performance of a constant inlining optimization. In such an example, code generator 225 may determine the optimal order for the code generation optimizations to be performance of the loop unrolling optimization first, performance of the constant folding optimization second, and performance of the constant inlining optimization third.

For an example of the parameterization of the optimizations, based on the determined information, assume that code generator 225 determines that the performance of loop unrolling optimization should only be applied to a set of loops sharing a common characteristic in one domain and a set of loops sharing a different common characteristic in another domain. In such an example, code generator 225 may determine the optimal application of a loop fusion to parameterize the loop fusion optimization differently for different domains.

In some implementations, code generator 225 may repeat the determinations of the application domain, the dependency of the code generation optimizations, the host device performance characteristics, the capabilities of the target compiler, and the target hardware profile until a fixed point or a threshold is attained. In some implementations, code generator 225 may perform these determinations, and may generate code based on the optimal order of the code generation optimizations. Code generator 225 may repeat the determinations until further improvements (e.g., as measured by the code efficiency metrics and/or the target hardware metrics) cannot be made to the generated code (e.g., until a fixed point is reached for the improvements).

In some implementations, code generator 225 may perform these determinations, and may generate code based on the optimal order of the code generation optimizations until a time threshold or a stack threshold is reached. For example, the time threshold may include a threshold value indicating a time period (e.g., in minutes, hours, or the like) during which code generator 225 is to generate the code. In another example, the time threshold may include a threshold value indicating a time period during which TCE 220 is to execute the generated code. In another example, the stack threshold may include a threshold value indicating a size of the stack needed to execute the generated code. In such an example, as the size of the stack increases, the cost of the target hardware may increase. In a third example, the time threshold may include a given number of permutations of optimization ordering and the optimal ordering found so far will be produced and used.

As further shown in FIG. 4, process 400 may include generating optimal code based on the optimal order of the code generation optimizations (block 480). For example, code generator 225 may utilize the optimal order of the code generation optimizations to generate optimal code for the model. In some implementations, the optimal code may be referred to as a function interface or an efficient function interface. In some implementations, code generator 225 may perform the code generation optimizations, in the optimal order, in order to generate the optimal code for the model. For example, assume that code generator 225 determines the optimal order for the code generation optimizations to be performance of a loop unrolling optimization first, performance of a constant folding optimization second, and performance of a constant inlining optimization third for a particular application domain. In such an example, code generator 225 may perform the loop unrolling optimization first, the constant folding optimization second, and the constant inlining optimization third in order to generate the optimal code for the model.

In some implementations, code generator 225 may generate the optimal code based on a determined data passing scheme, such as, for example, a function argument pass-by-value scheme, a function argument pass-by-reference scheme, a data passing through a function return value scheme, a global data access function scheme, or the like. In some implementations, the optimal code may include one or more methods that are provided or passed arguments (e.g., a constant or a variable) when the one or more methods are called. Pass-by-value may refer to passing a constant or a variable with a primitive data type to a method. Pass-by-reference may refer to passing an object variable to a method. Data passing through a function return value (or return value optimization) may refer to eliminating a temporary object created to hold a function's return value, which may change a behavior of the optimal code. Global access data function may refer to eliminating message passing between components (e.g., processors) of the target hardware when executing the optimal code.

In some implementations, the optimal code may include code provided in a programming language such as C or C++, an assembly language, an intermediate representation language (e.g., low level virtual machine (LLVM), or the like), or the like. In some implementations, the optimal code may include code that is customized, without manual input from the user, for the target hardware. The optimal code may be customized since the code is adjusted to specific target hardware on which the code will be executed.

In some implementations, the optimal code may reduce data storage and copying between portions of the code, which may reduce code execution time and memory consumption. For example, the optimal code may reduce data storage and copying between portions of the code since the optimal code is based on the optimal order of the code generation optimizations and one of the data passing schemes.

In some implementations, the optimal code may maintain locality of data references, which may reduce cache and register over-utilization. For example, the optimal code may maintain locality of data references since the optimal code is based on the code efficiency metrics and the target hardware metrics.

In some implementations, the optimal code may facilitate code reuse, which may reduce code size. For example, the optimal code may facilitate code reuse since the optimal code may be based on performing checksums (e.g., which identify code reuse opportunities) on the model.

In some implementations, code generator 225 may cause client device 210 to display the optimal code to the user. In some implementations, the optimal code may be displayed with or without the model. In some implementations, code generator 225 may cause client device 210 to store the optimal code, the determined information, and/or the optimal order of the code generation optimizations in a library (e.g., in memory 330, FIG. 3) associated with client device 210. In some implementations, the optimal order may be presented to the user, and the user may modify the optimal order and may utilize the modified order to generate code. In some implementations, performance metrics may be presented to the user so that the user can see the effect of the changes.

In some implementations, given the knowledge of application domains, common components and modeling patterns (e.g., blocks, lines, or the like), regions of operations, the implementation of modeling constructs, and the optimal code, code generator 225 may determine an optimal order and/or parameterization for compiler transforms via an exhaustive search, machine learning, trial and error, or the like. For example, model developers may build a modeling pattern library to capture past design experience. Based on this library of patterns, code generator 225 may analyze optimization orderings to identify effective optimization orderings for each pattern either through traditional search algorithms or through more intelligent search based on advanced artificial intelligence techniques. In some implementations, code generator 225 may utilize the knowledge to control compiler transforms, the optimal order, the parameterization (e.g., depth of expression folding), satisfaction of an objective (e.g., minimal ROM, RAM, execution speed, etc.), or the like. In some implementations, the patterns may be provided by a user; may be utilized with an exhaustive search to determine desired compiler transform ordering and/or parameterization meeting some objective; may be received from users and redistributed to other users; may be received from users, utilized with an exhaustive search to solve an objective, and redistributed to other users; may be utilized with a smart search and existing knowledge of transform dependencies to determine desired transform ordering and/or parameterization, or the like.

In some implementations, a user may provide feedback (e.g., approval or disapproval) about an objective via an interactive objective search. In some implementations, the objective may take into account target information, such as compiler information, profile result, embedded device information, host performance information, or the like. In some implementations, machine learning, neural networks, genetic algorithms, or the like may be utilized to create a rules database for the objective.

In some implementations, code generator 225 may automatically partition a model in order to recognize patterns in the model, and may generate a user interface that enables a user to specify patterns. In some implementations, code generator 225 may generate a user interface that provides pattern results (e.g., to link code back to model and patterns, and vice versa) and/or provides user results for different patterns (or no patterns).

In some implementations, code generator 225 may adaptively create or identify effective orderings and parameterizations of the optimizations for a specific region of operations, a modeling pattern, a domain, a use context, or the like. To achieve this, code generator 225 may summarize the region of operations with a characterization that captures characteristics relevant to optimizations. Additionally, code generator 225 may formulate a search of effective optimization orderings and parameterizations as an optimization problem, and may adaptively solve the optimization problem. For example, code generator 225 may encode an optimization ordering search space so that the optimization ordering space may be explored with methods, such as a genetic algorithm. As such, code generator 225 may explore the optimization ordering space to determine an effective ordering for a particular characterization. Furthermore, given an effective optimization ordering for a class of regions sharing the same characterization, code generator 225 may explore the search space, starting from an effective ordering, to find an effective ordering for a slightly different characterization. In another example, code generator 225 may use a knowledge base of effective optimization orderings and parameterizations and their associated characterization. With this approach, code generator 225 may encode the knowledge base into training data for machine learning techniques, such as a neural network algorithm. As such, with sufficient training, code generator 225 may identify an effective optimization ordering for a previously unknown characterization.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5B:
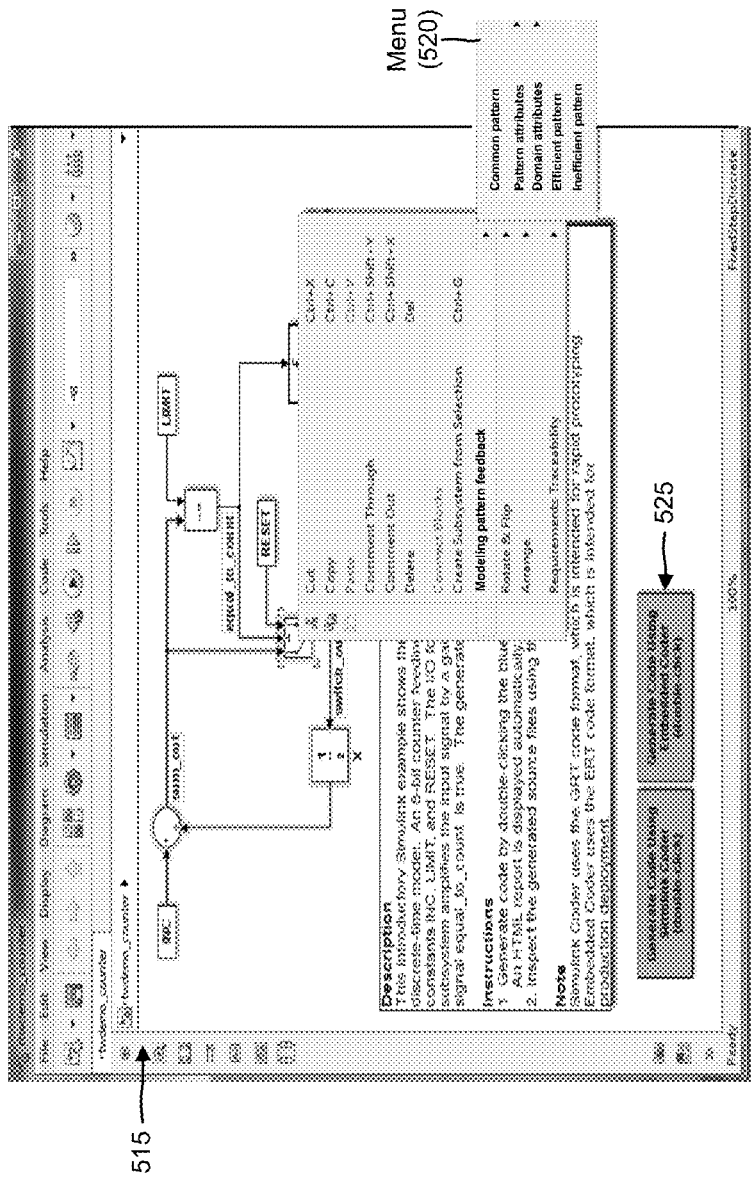

FIGS. 5A-5D are diagrams of an example 500 relating to example process 400 shown in FIG. 4. In example 500, assume that a user utilizes client device 210 to access TCE 220. Further, assume that TCE 220 causes client device 210 to display a user interface 505 associated with TCE 220, as shown in FIG. 5A. User interface 505 may enable the user to perform operations with TCE 220. For example, the user may utilize user interface 505 to define and create a model 510 for TCE 220, as further shown in FIG. 5A. Model 510 may include a control logic domain model with multiple blocks and signals provided between the blocks. The user may utilize TCE 220 to select a modeling pattern (or portion) 515 of model 510 for which to generate code. For example, as shown in FIG. 5A, the user may select modeling pattern 515 that includes a summation block that performs addition, a delay block (X), and a switch block.

After the user selects modeling pattern 515, the user may utilize a menu 520 to instruct code generator 225 to determine feedback for modeling pattern 515, as shown in FIG. 5B. For example, the user may utilize menu 520 to determine common information for modeling pattern 515, attributes for modeling pattern 515, attributes for the application domain (e.g., a control logic domain) of model 510, efficiency information for modeling pattern 515, and inefficiency information for modeling pattern 515. As further shown in FIG. 5B, the user may utilize buttons 525 to instruct code generator 225 to generate code based on model 510 and/or modeling pattern 515.

Figure 5C:
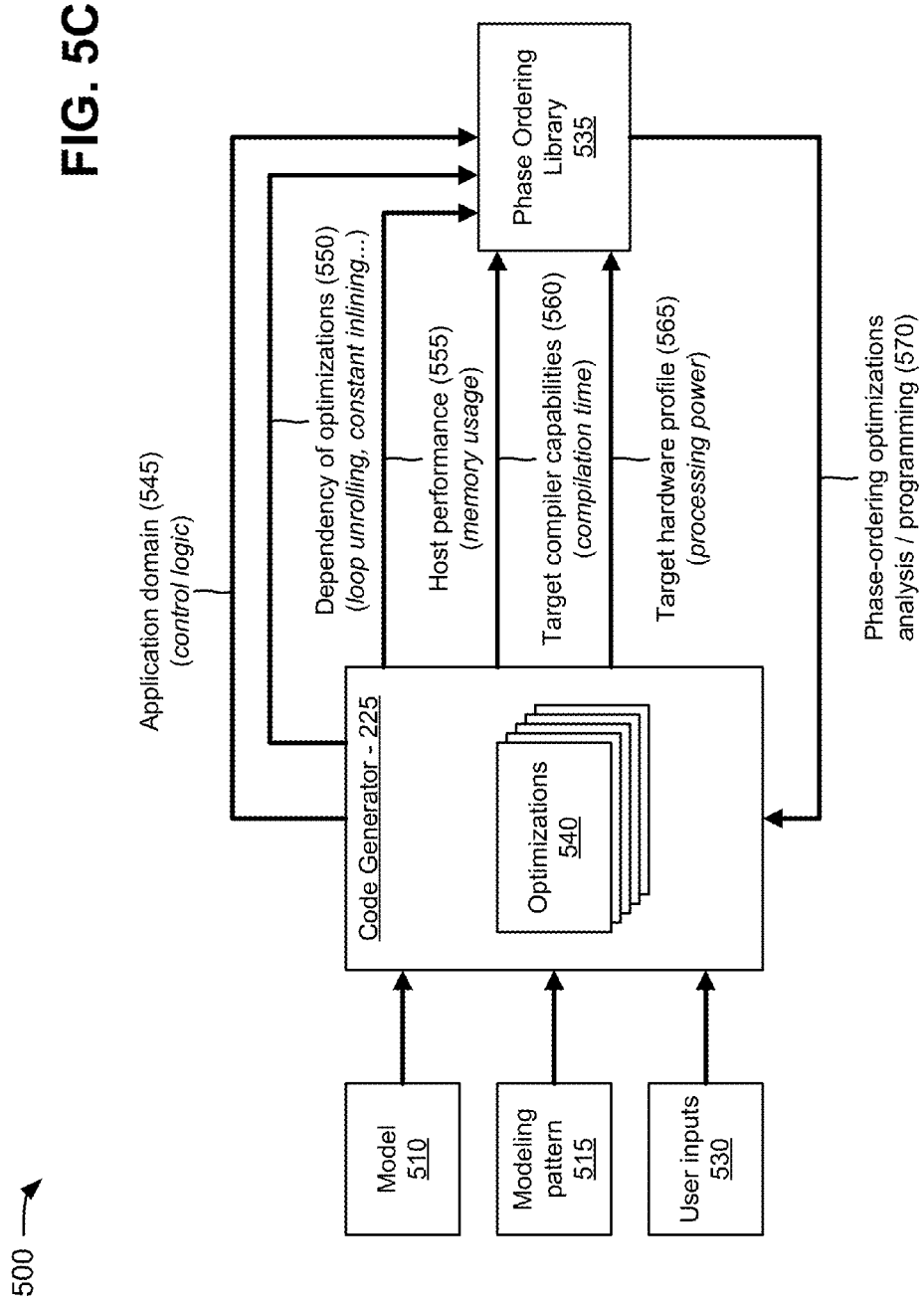

As shown in FIG. 5C, based on the selection of one of buttons 525, code generator 225 may receive model 510, modeling pattern 515, and user inputs 530. User inputs 530 may include information indicating which of buttons 525 the user selected, and information indicating which item(s) of menu 520 that the user selected. As further shown, code generator 225 may be associated with a phase ordering library 535 that stores information associated with domain-aware phase orders previously determined and/or received by code generator 225. Code generator 225 may determine one or more code generation optimizations 540 (e.g., loop unrolling, constant inlining, or the like) based on model 510, modeling pattern 515, user inputs 530, and/or information provided in phase ordering library 535.

As further shown in FIG. 5C, code generator 225 may determine an application domain 545 for model 510, and may determine a dependency 550 of code generation optimizations 540 for model 510 and/or modeling pattern 515. For example, assume that code generator 225 determines that application domain 545 includes a control logic domain. Further, assume that dependency 550 includes information indicating that a performance of a constant inlining optimization is improved by performance of a loop unrolling optimization, and that a performance of a constant folding optimization is improved by performance of the constant inlining optimization.

Code generator 225 may determine host device performance characteristics 555 for generating code based on model 510 and/or modeling pattern 515, and target compiler capabilities 560 for the generated code. For example, assume that code generator 225 determines a usage of the host device's memory required to generate the code as one of host device performance characteristics 555, and a time required to compile the generated code as one of target compiler capabilities 560. Code generator 225 may determine a target hardware profile 565 for the generated code to include a processing power of a target processor used to execute the generated code. As further shown in FIG. 5C, application domain 545, dependency 550 of code generation optimizations 540, host device performance characteristics 555, target compiler capabilities 560, and target hardware profile 565 may be provided to and stored by phase ordering library 535.

Code generator 225 may communicate with phase ordering library 535, and may repeat the determinations of application domain 545, dependency 550 of code generation optimizations 540, host device performance characteristics 555, target compiler capabilities 560, and target hardware profile 565, as indicated by reference number 570, until code generator 225 determines an optimal order for code generation optimizations 540.

Figure 5D:
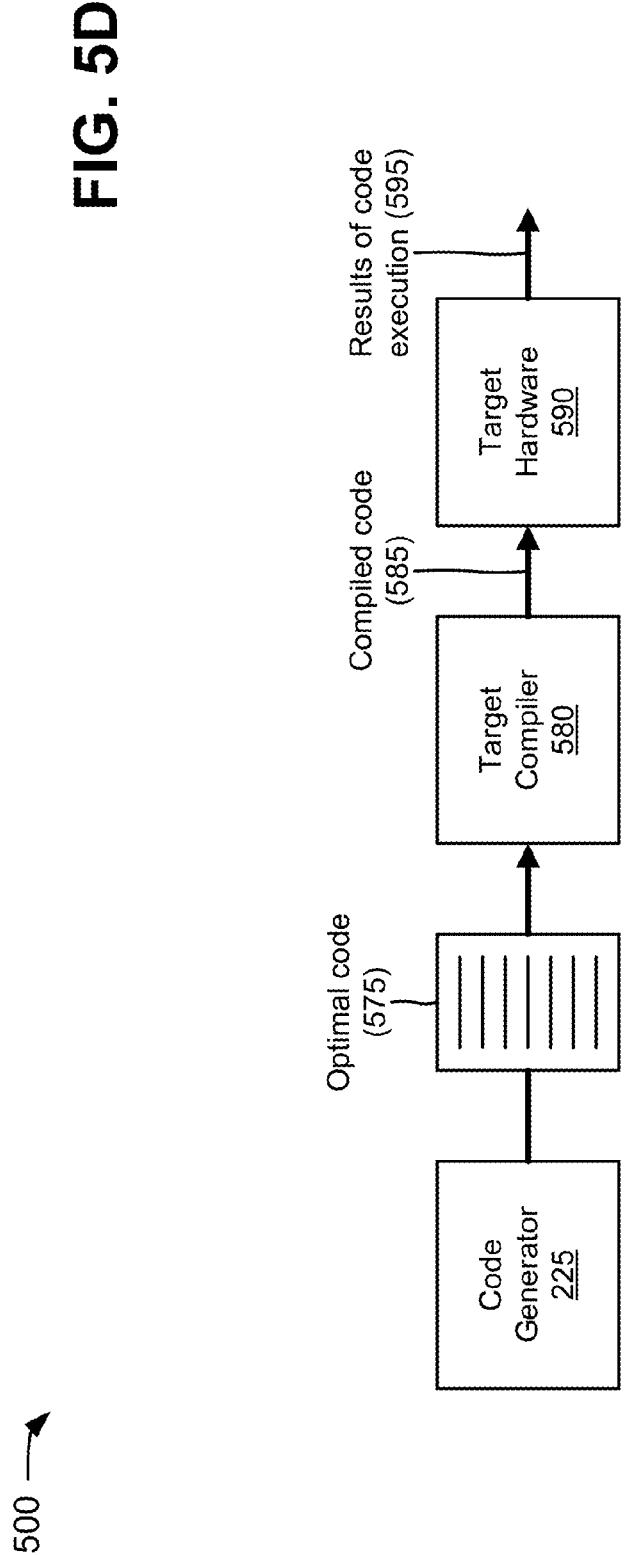

Code generator 225 may utilize the optimal order for code generation optimizations 540 to generate optimal code 575 for model 510 and/or modeling pattern 515, as shown in FIG. 5D. Assume that code generator 225 determines the optimal order for code generation optimizations 540 to be performance of the loop unrolling optimization first, performance of the constant inlining optimization second, and performance of the constant folding optimization third. Based on the optimal order, code generator 225 may perform the loop unrolling optimization first, the constant inlining optimization second, and the constant folding optimization third in order to generate optimal code 575.

As further shown in FIG. 5D, code generator 225 may provide optimal code 575 to a target compiler 580 provided in client device 210 or server device 230. Target compiler 580 may compile optimal code 575 to generate compiled code 585. For example, target compiler 580 may transform optimal code 575, written in a source programming language, into an executable program written in a target representation (e.g., compiled code 585). Target hardware 590 may execute compiled code 585 to generate results 595, as further shown in FIG. 5D. TCE 220 may cause client device 210 to display results 595 to the user, to store results 595, and/or to provide results 595 to server device 230.

As indicated above, FIGS. 5A-5D are provided merely as an example. Other examples are possible and may differ from what was described with regard to FIGS. 5A-5D. In some implementations, the various operations described in connection with FIGS. 5A-5D may be performed automatically or at the request of the user.

FIGS. 6A and 6B are diagrams of another example 600 relating to example process 400 shown in FIG. 4. In example 600, assume that a user utilizes client device 210 to access TCE 220. Further, assume that TCE 220 causes client device 210 to display a user interface 605 associated with TCE 220, as shown in FIG. 6A. User interface 605 may enable the user to perform operations with TCE 220. For example, the user may utilize user interface 605 to define and create a model 610 for TCE 220, as further shown in FIG. 6A. Model 610 may include a signal processing domain model with multiple blocks and signals provided between the blocks. The user may utilize TCE 220 to select a region of operations (or portion) 615 of model 610 for which to generate code. For example, as shown in FIG. 6A, the user may select region of operations 615 which contains the textual pattern of an accumulator inside the block.

After the user selects region of operations 615, the user may instruct code generator 225 to generate code based on model 610 and/or region of operations 615. As shown in FIG. 6B, based on the instruction, code generator 225 may receive model 610, region of operations 615, and user inputs 620. User inputs 620 may include information indicating a type of code to generate, information indicating attributes of an application domain of model 610, or the like. Code generator 225 may determine one or more code generation optimizations 625 (e.g., constant inlining, loop unrolling, or the like) based on model 610, region of operations 615, user inputs 620, and/or information provided in phase ordering library 535.

As further shown in FIG. 6B, code generator 225 may determine an application domain 630 for model 610, and may determine a dependency 635 of code generation optimizations 625 for model 610 and/or region of operations 615. For example, assume that code generator 225 determines that application domain 630 includes a signal processing domain. Further, assume that dependency 635 includes information indicating that a performance of a loop unrolling optimization is improved by performance of a constant inlining optimization, and that a performance of a constant folding optimization is improved by performance of the loop unrolling optimization.

Code generator 225 may determine host device performance characteristics 640 for generating code based on model 610 and/or region of operations 615, and target compiler capabilities 645 for the generated code. For example, assume that code generator 225 determines a speed of the host device's processor required to generate the code as one of host device performance characteristics 640, and a compiler capacity required to compile the generated code as one of target compiler capabilities 645. Code generator 225 may determine a target hardware profile 650 for the generated code to include a size and availability of a target memory used to execute the generated code. As further shown in FIG. 6B, application domain 630, dependency 635 of code generation optimizations 625, host device performance characteristics 640, target compiler capabilities 645, and target hardware profile 650 may be provided to and stored by phase ordering library 535.

Code generator 225 may communicate with phase ordering library 535, and may repeat the determinations of application domain 630, dependency 635 of code generation optimizations 625, host device performance characteristics 640, target compiler capabilities 645, and target hardware profile 650, as indicated by reference number 655, until code generator 225 determines an optimal order for code generation optimizations 625. Code generator 225 may utilize the optimal order for code generation optimizations 625 to generate optimal code for model 610 and/or region of operations 615. Code generator 225 may perform code generation optimizations 625, in the optimal order, in order to generate the optimal code. Assume that code generator 225 determines the optimal order for code generation optimizations 540 to be performance of the constant inlining optimization first, performance of the loop unrolling optimization second, and performance of the constant folding optimization third. Based on the optimal order, code generator 225 may perform the constant inlining optimization first, the loop unrolling optimization second, and the constant folding optimization third in order to generate the optimal code.

As indicated above, FIGS. 6A and 6B are provided merely as an example. Other examples are possible and may differ from what was described with regard to FIGS. 6A and 6B. In some implementations, the various operations described in connection with FIGS. 6A and 6B may be performed automatically or at the request of the user.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

User interfaces may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, or the like). The user interfaces may receive user inputs via one or more input devices, may be user-configurable (e.g., a user may change the sizes of the user interfaces, information displayed in the user interfaces, color schemes used by the user interfaces, positions of text, images, icons, windows, or the like, in the user interfaces, or the like), and/or may not be user-configurable. Information associated with the user interfaces may be selected and/or manipulated by a user of a technical computing environment (TCE) (e.g., via a touch screen display, a mouse, a keyboard, a keypad, voice commands, or the like).

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving a model in a technical computing environment,
      the model including a plurality of blocks and a plurality of lines, and
      the receiving the model being performed by a device;
   determining an application domain associated with the model,
      the application domain corresponding to a physical system, a component, a modeling pattern, or a region of operations associated with the model, and
      the determining the application domain being performed by the device;
   determining a plurality of code generation optimizations for the model,
      the determining the plurality of code generation optimizations being performed by the device;
   determining dependencies of the plurality of code generation optimizations,
      the determining the dependencies of the plurality of code generation optimizations being performed by the device;
   identifying an order for the plurality of code generation optimizations based on one or more of the application domain of the model or the dependencies of the plurality of code generation optimizations,
      the identifying the order for the plurality of code generation optimizations being performed by the device;
   generating optimal code for the model based on the identified order for the plurality of code generation optimizations,
      the generating the optimal code being performed by the device; and
   outputting or storing the optimal code,
      the outputting or storing the optimal code being performed by the device.

2. The method of claim 1, where generating the optimal code comprises:
   performing the plurality of code generation optimizations in the identified order; and
   generating the optimal code for the model based on the performance of the plurality of code generation optimizations in the identified order.

3. The method of claim 1, where the plurality of code generation optimizations include one or more of:
   a code motion optimization,
   a constant inlining optimization,
   a constant folding optimization, or
   a loop unrolling optimization.

4. The method of claim 1, further comprising:
   determining performance characteristics for the device,
      the performance characteristics including performance characteristics of the device required to generate code based on the model;
   determining capabilities of a target compiler for the code generated based on the model;
   determining a profile for target hardware to be used to execute the code generated based on the model; and
   identifying the order for the plurality of code generation optimizations based on one or more of the application domain of the model, the dependencies of the plurality of code generation optimizations, the performance characteristics for the device, the capabilities of the target compiler, or the profile for the target hardware.

5. The method of claim 4, where determining the capabilities of the target compiler for the code comprises:
   utilizing code efficiency metrics to determine the capabilities of the target compiler for the code,
      the code efficiency metrics including one or more of:
         a metric that relates to a quantity of global variables in the code,
         a metric that relates to stack utilization by the code, or
         a metric that relates to a quantity of data copies in the code.

6. The method of claim 4, where determining the profile for the target hardware comprises:
   utilizing metrics associated with the target hardware to determine the profile for the target hardware,
      the metrics associated with the target hardware including one or more of:
         a metric that relates to an instruction set of the target hardware,
         a metric that relates to a register set of the target hardware,
         a metric that relates to a memory size of the target hardware, or
         a metric that relates to computing capabilities of the target hardware.

7. The method of claim 4, where identifying the order for the plurality of code generation optimizations comprises:

repeating the determinations of the application domain, the dependencies of the plurality of code generation optimizations, the performance characteristics, the capabilities of the target compiler, and the profile for the target hardware until a threshold is attained; and identifying the order for the plurality of code generation optimizations after the threshold is attained.

8. The method of claim 1, where identifying the order for the plurality of code generation optimizations comprises:

automatically determining the order for the plurality of code generation optimizations by adaptively solving an optimization problem.

9. A device, comprising:

one or more processors to:

receive a model in a technical computing environment, the model being associated with an application domain;

determine the application domain associated with the model, the application domain corresponding to functionality associated with the model;

determine a plurality of code generation optimizations for the model;

determine dependencies of the plurality of code generation optimizations;

determine performance characteristics for the device;

determine capabilities of a target compiler for code generated based on the model;

determine a profile for target hardware to be used to execute the code generated based on the model;

identify an order for the plurality of code generation optimizations based on one or more of the application domain, the dependencies of the plurality of code generation optimizations, the performance characteristics, the capabilities of the target compiler, or the profile for the target hardware;

generate optimal code for the model based on the identified order for the plurality of code generation optimizations; and output or store the optimal code.

10. The device of claim 9, where, when generating the optimal code, the one or more processors are further to:

perform the plurality of code generation optimizations in the identified order; and generate the optimal code for the model based on the performance of the plurality of code generation optimizations in the identified order.

11. The device of claim 9, where the plurality of code generation optimizations include one or more of:

a code motion optimization, a constant inlining optimization, a constant folding optimization, or a loop unrolling optimization.

12. The device of claim 9, where, when determining the capabilities of the target compiler for the code, the one or more processors are further to:

utilize code efficiency metrics to determine the capabilities of the target compiler for the code, the code efficiency metrics including one or more of:

a metric that relates to a quantity of global variables in the code, a metric that relates to stack utilization by the code, or a metric that relates to a quantity of data copies in the code.

13. The device of claim 9, where, when determining the profile for the target hardware, the one or more processors are further to:

utilize metrics associated with the target hardware to determine the profile for the target hardware, the metrics associated with the target hardware including one or more of:

a metric that relates to an instruction set of the target hardware, a metric that relates to a register set of the target hardware, a metric that relates to a memory size of the target hardware, or a metric that relates to computing capabilities of the target hardware.

14. The device of claim 9, where, when identifying the order for the plurality of code generation optimizations, the one or more processors are further to:

repeat the determinations of the application domain, the dependencies of the plurality of code generation optimizations, the performance characteristics, the capabilities of the target compiler, and the profile for the target hardware until a threshold is attained; and identify the order for the plurality of code generation optimizations after the threshold is attained.

15. The device of claim 9, where the application domain includes one or more of:

an electrical domain, a mechanical domain, a hydraulic domain, a control logic domain, or a signal processing domain.

16. The device of claim 9, where, when identifying the order for the plurality of code generation optimizations, the one or more processors are further to:

automatically determine the order for the plurality of code generation optimizations by adaptively solving an optimization problem.

17. A computer-readable medium storing instructions, the instructions comprising:

one or more instructions that, when executed by one or more processors of a device, cause the one or more processors to:

receive a model in a technical computing environment, the model including a plurality of blocks and a plurality of lines, determine an application domain associated with the model, the application domain corresponding to a physical system associated with the model;

determine a plurality of code generation optimizations for the model;

determine dependencies of the plurality of code generation optimizations;

determine performance characteristics for the device;

determine capabilities of a target compiler for code generated based on the model;

determine a profile for target hardware to be used to execute the code generated based on the model;

identify an order for the plurality of code generation optimizations based on one or more of the application domain, the dependencies of the plurality of code generation optimizations, the performance characteristics, the capabilities of the target compiler, or the profile for the target hardware;

generate optimal code for the model based on the identified order for the plurality of code generation optimizations; and output or store the optimal code.

18. The computer-readable medium of claim 17, where the one or more instructions that cause the one or more processors to generate the optimal code, further cause the one or more processors to:
- perform the plurality of code generation optimizations in the identified order; and
- generate the optimal code for the model based on the performance of the plurality of code generation optimizations in the identified order.

19. The computer-readable medium of claim 17, where the plurality of code generation optimizations include one or more of:
- a code motion optimization,
- a constant inlining optimization,
- a constant folding optimization, or
- a loop unrolling optimization.

20. The computer-readable medium of claim 17, where the one or more instructions that cause the one or more processors to determine the capabilities of the target compiler for the code, further cause the one or more processors to:
- utilize code efficiency metrics to determine the capabilities of the target compiler for the code,
  the code efficiency metrics including one or more of:
  - a metric that relates to a quantity of global variables in the code,
  - a metric that relates to stack utilization by the code, or
  - a metric that relates to a quantity of data copies in the code.

21. The computer-readable medium of claim 17, where the one or more instructions that cause the one or more processors to determine the profile for the target hardware, further cause the one or more processors to:
- utilize metrics associated with the target hardware to determine the profile for the target hardware,
  the metrics associated with the target hardware including one or more of:
  - a metric that relates to an instruction set of the target hardware,
  - a metric that relates to a register set of the target hardware,
  - a metric that relates to a memory size of the target hardware, or
  - a metric that relates to computing capabilities of the target hardware.

22. The computer-readable medium of claim 17, where the one or more instructions that cause the one or more processors to identify the order for the plurality of code generation optimizations, further cause the one or more processors to:
- repeat the determinations of the application domain, the dependencies of the plurality of code generation optimizations, the performance characteristics, the capabilities of the target compiler, and the profile for the target hardware until a threshold is attained; and
- identify the order for the plurality of code generation optimizations after the threshold is attained.

23. The computer-readable medium of claim 17, where the one or more instructions that cause the one or more processors to identify the order for the plurality of code generation optimizations, further cause the one or more processors to:
- automatically determine the order for the plurality of code generation optimizations by adaptively solving an optimization problem.

* * * * *